(12) United States Patent
Martinez et al.

(10) Patent No.: US 7,296,061 B2
(45) Date of Patent: Nov. 13, 2007

(54) DISTRIBUTED WEB SERVICES NETWORK ARCHITECTURE

(75) Inventors: Frank Martinez, La Canada, CA (US); Paul Kevin Toth, Daly City, CA (US)

(73) Assignee: Blue Titan Software, Inc., San Francisco, CA (US)

( * ) Notice: Subject to any disclaimer, the term of this patent is extended or adjusted under 35 U.S.C. 154(b) by 583 days.

(21) Appl. No.: 09/990,722

(22) Filed: Nov. 21, 2001

(65) Prior Publication Data

US 2003/0097464 A1    May 22, 2003

(51) Int. Cl.
*G06F 15/16*    (2006.01)
*G06F 15/173*    (2006.01)

(52) U.S. Cl. ...................... 709/211; 709/238

(58) Field of Classification Search .................. 705/37; 709/201–253; 707/1–10, 100–104.1, 200–206
See application file for complete search history.

(56) References Cited

U.S. PATENT DOCUMENTS

| | | | |
|---|---|---|---|
| 5,491,692 A | 2/1996 | Gunner et al. | |
| 5,951,694 A | 9/1999 | Choquier et al. | |
| 6,041,049 A | 3/2000 | Brady | |
| 6,112,248 A | 8/2000 | Maciel et al. | |
| 6,215,765 B1 | 4/2001 | McAllister et al. | |
| 6,408,282 B1* | 6/2002 | Buist | 705/36 R |
| 2001/0054020 A1* | 12/2001 | Barth et al. | 705/37 |
| 2001/0056416 A1* | 12/2001 | Garcia-Luna-Aceves | 707/2 |
| 2002/0004846 A1* | 1/2002 | Garcia-Luna-Aceves et al. | 709/245 |
| 2002/0069279 A1* | 6/2002 | Romero et al. | 709/225 |
| 2003/0041094 A1* | 2/2003 | Lara et al. | 709/201 |

\* cited by examiner

*Primary Examiner*—George C. Neurauter, Jr.
(74) *Attorney, Agent, or Firm*—Mark J. Spolyar

(57) ABSTRACT

Methods, apparatuses and systems facilitating deployment, configuration and maintenance of web services networks. The present invention features a distributed web services network architecture that, in one embodiment, leverages the functionality of existing network infrastructure to provide a low cost, efficient and reliable web services solution. The web services network architecture according to the present invention can be implemented across any suitable computer network, including an intranet or the Internet.

25 Claims, 7 Drawing Sheets

| Routing Entity | Local Routing Table | Child Node A | Child Node B |
|---|---|---|---|
| Subscriber X | 12/10/02; 17:26 | 12/12/02; 11:16 | 10/12/02; 10:53 |
| Subscriber Y | 12/19/02; 15:05 | 12/19/02; 15:51 | 12/20/02; 13:15 |
| Publisher X | 12/05/02; 13.27 | 01/03/03; 16:14 | 01/04/03; 16:15 |
| Service X | 12/01/02; 16.21 | 12/05/02; 16:22 | 12/04/02; 18:16 |
| Action X | 01/06/03; 18:45 | 01/05/03; 14:17 | 01/07/03; 19:21 |
| End-User X | 12/21/02; 15:11 | 12/22/02; 15:16 | 12/21/02; 19:16 |

DISTRIBUTED WEB SERVICES NETWORK ARCHITECTURE

FIELD OF THE INVENTION

The present invention relates to computer networks and, more particularly, to methods, apparatuses and systems facilitating deployment, configuration, and maintenance of web services networks.

BACKGROUND OF THE INVENTION

Web services networks are rapidly evolving technology architectures allowing applications to tap into a variety of services in an extremely efficient and cost effective manner. Web services enable cost-effective and efficient collaboration among entities within an enterprise or across enterprises. Web services are URL or IP addressable resources that exchange data and execute processes. Essentially, web services are applications exposed as services over a computer network and employed by other applications using Internet standard technologies, such as XML, SOAP, WSDL, etc. Accordingly, web applications can be quickly and efficiently assembled with services available within an enterprise LAN or external services available over open computer networks, such as the Internet.

A web services network can be deployed across an enterprise LAN or across a Wide Area Network, such as the Internet. A typical web services network includes at least one network services broker that is operative to receive a service request and route the service request to the appropriate resource. A broker is a specially configured server or cluster of servers acting as an intermediary for web service requests and responses. As web services network usage increases, however, the broker can become a bottleneck. To ease this bottleneck, the prior art solution is simply to add additional processing power to the broker (e.g., additional servers), which is costly, inefficient, and fails to leverage the enterprise's investments in its existing network infrastructure. Moreover, the centralized nature of the broker creates reliability concerns in that failure of the broker disables the applications accessing services through it.

In light of the foregoing and the rapidly expanding use of web and network services, a need in the art exists for methods, apparatuses and systems that reduce the cost associated with operating web services networks. In addition, a need in the art exists for technology that leverages existing network infrastructure to create an efficient and cost effective web services network. As described below, the present invention substantially fulfills these and other needs associated with web services networks.

SUMMARY OF THE INVENTION

The present invention provides methods, apparatuses and systems facilitating deployment, configuration and maintenance of web services networks. The present invention features a distributed web services network architecture that, in one embodiment, leverages the functionality of existing network infrastructure to provide a low cost, efficient and reliable web services solution. The web services network architecture according to the present invention can be implemented across any suitable computer network, including an intranet or the Internet.

DESCRIPTION OF PREFERRED EMBODIMENT(S)

Figure 1:
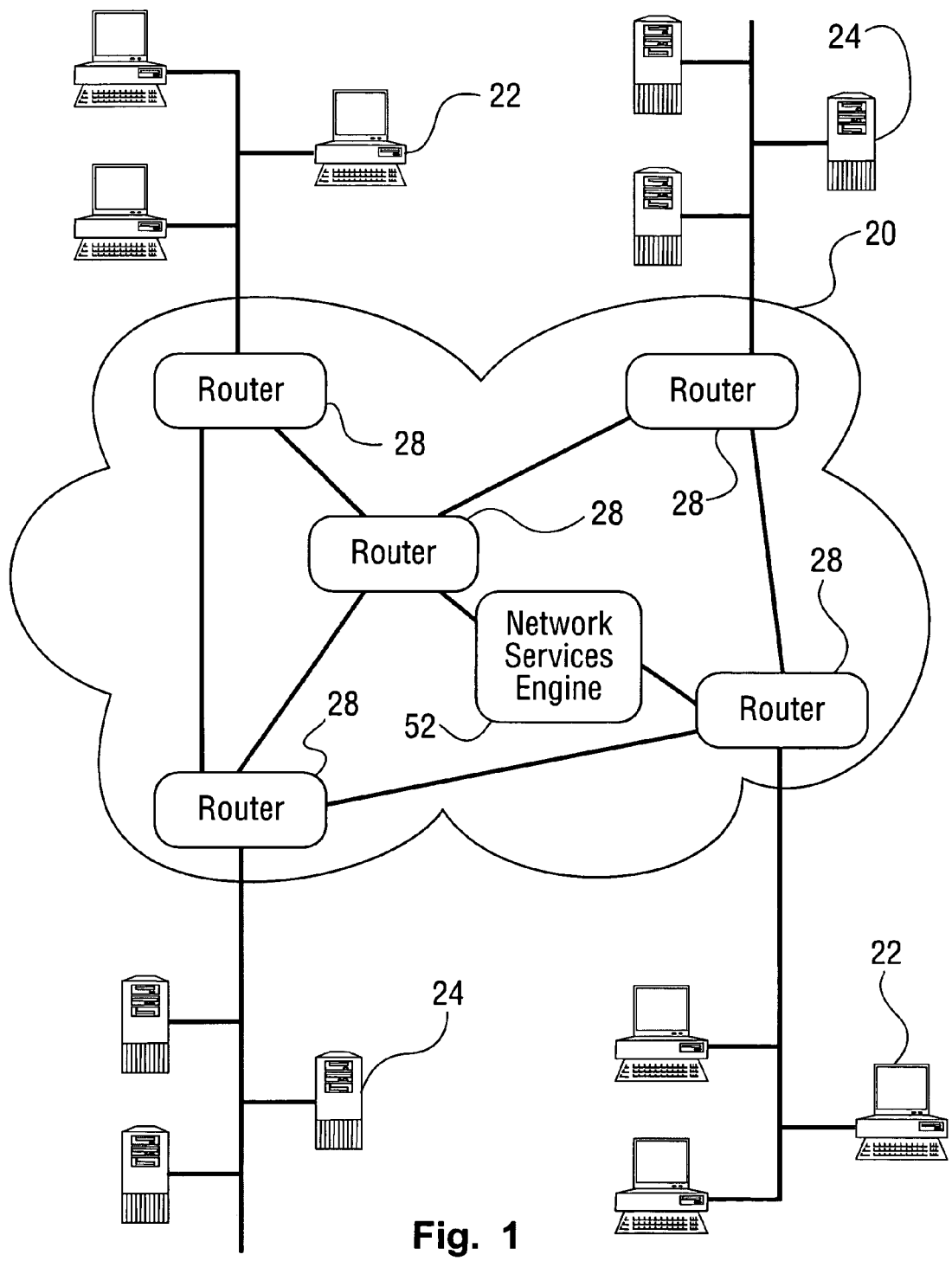
FIG. 1 is a functional block diagram illustrating a computer network environment including an embodiment of the distributed web services network according to the present invention.

FIG. 1 illustrates a computer network environment including an embodiment of the present invention. As FIG. 1 illustrates, the computer network environment comprises a plurality of host nodes, such as client computers 22 and servers 24, interconnected by computer network 20. Computer network 20 comprises routers 22 and other networking equipment to transmit and route data between host nodes connected to the network. Computer network 20 further comprises network services engine 54 operably connected to at least one routing device augmented to include the functionality of a network services switch 56 thereby enabling a web services network according to the present invention, as more fully described below. In one embodiment, the web services network enabled by the present invention employs standard Internet protocols, such as SOAP and XML, to exchange data. However, any suitable protocols can be used.

I. Network Environment

Figure 2:
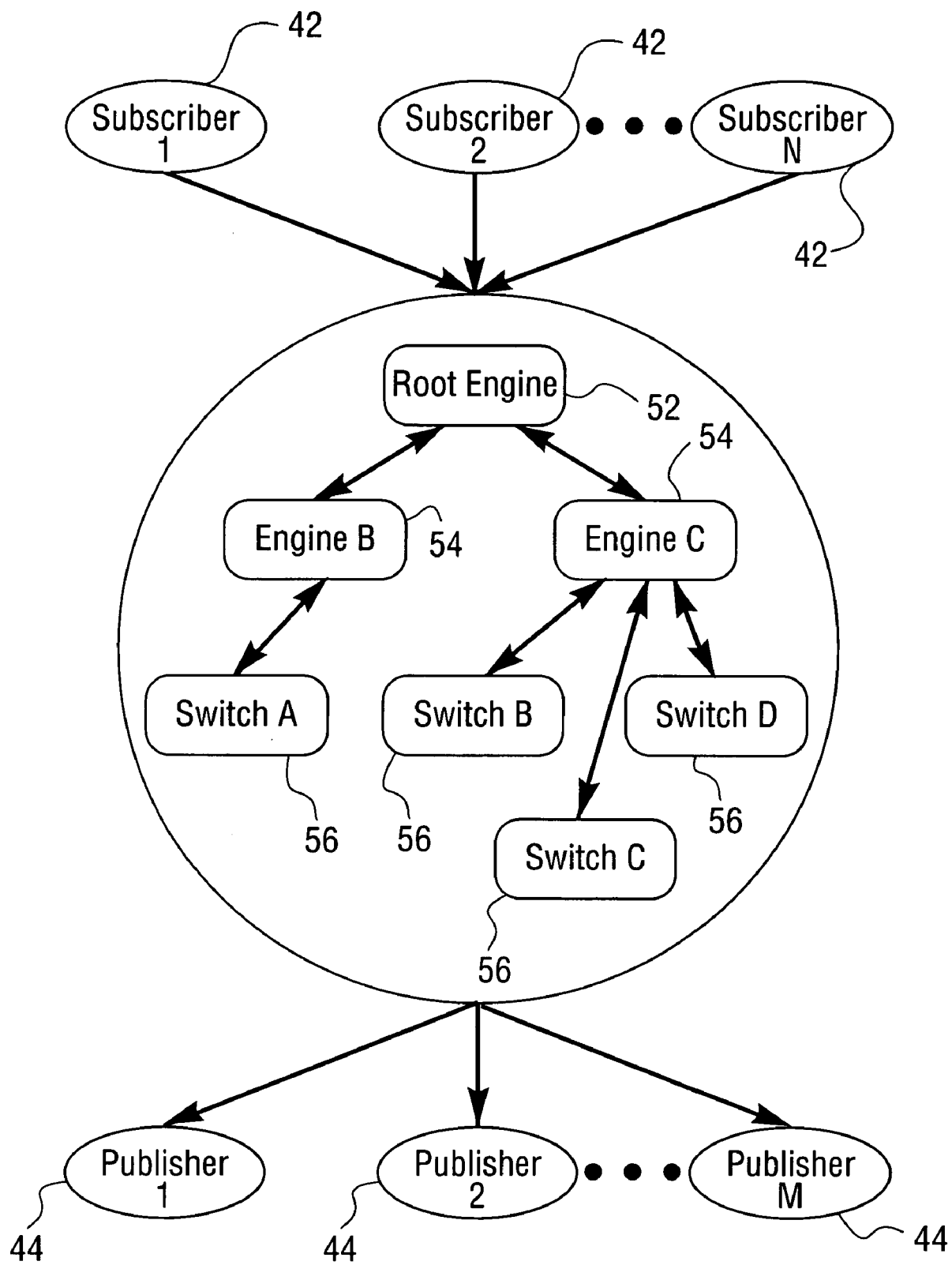
FIG. 2 is functional block diagram setting forth the network architecture associated with an embodiment of the present invention.
Figure 3:
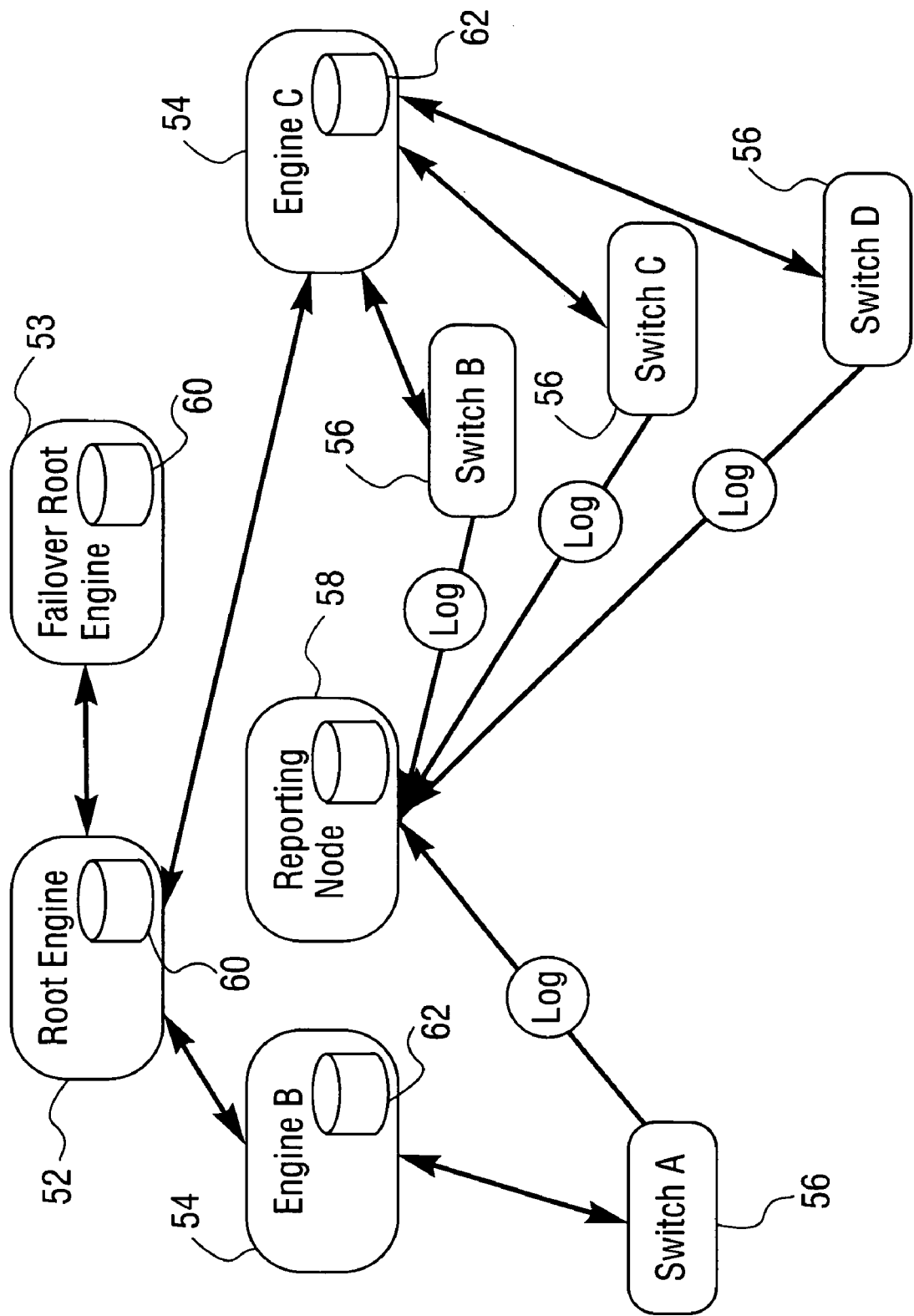
FIG. 3 is a functional block diagram providing a web services network architecture including reporting functionality on a dedicated node.

The distributed web services network architecture according to the present invention comprises at least one network services engine 52 or 54 operating in connection with at least one least one network services switch 56. FIGS. 2 and 3 illustrate the distributed web services network architecture according to one embodiment of the present invention. FIG. 2 provides a basic block diagram illustrating the topography of a web services network that utilizes one or more instances of network services switch 56. FIG. 2 sets forth a web services network including N subscriber nodes 42, M publisher nodes 44 and seven routing nodes, four of which are instances of network services switch 56 and three of which are instances of network services engine 54. The directed lines pointing to and from the network sphere represent the path taken by service action requests emanating from subscriber nodes 42 passing through the network to publisher nodes 44. The lines between routing nodes represent routing table dependencies, as more fully described below.

As discussed in more detail below, network services engines 52, 54 include functionality associated with all aspects of a web services network, including network and routing node configuration, network maintenance, discovery, registration, subscription, logging and reporting, as well as the handling of routing and associated tasks. In one embodiment, the functionality of network services engines 52, 54 are presented as internal web services on the network. As discussed below, network services engines 52, 54 are also operative to support and maintain network services switches 56 associated therewith. In one form, network services engines 52, 54 may be configured to operate in a mode where only a subset of available functionality is enabled. For example, a particular engine, such as root engine 52, may be configured such that it does not perform routing of service action requests and responses.

As FIG. 3 shows, each network services engine 52, 54 operates independently with its own database 60 and its own configuration set. Some of the tasks performed by network services engines 52, 54 can be quite resource-intensive. Network services engine 54 supports the creation of highly distributed systems but can be a large application requiring large amounts of persistent memory and processing power. A good example of this is logging of service action requests and responses traversing the network. Because every request and every response that flows through a network services engine requires a certain amount of metadata to be persisted, it is necessary that engine 54 be capable of handling a potentially heavy Load of database interactions.

While multiple instances of network services engine 54 may be installed to support a highly active web services network, such a configuration can be very costly requiring installation and configuration of multiple, dedicated servers on computer network 20. The introduction of network services switch 56 provides a more efficient and less expensive alternative. Network services switch 56 includes a subset of the functionality of network services engine 52 or 54 and is capable of handling routing of service action requests and responses, as well as associated tasks such as application-level security. Operation of network services switch 56 is designed to reduce the amount of computational resources required to function at an acceptable level. Network services switch 56, in one embodiment, has a small footprint, rendering instances of switch 56 suitable for installation on embedded systems associated with computer network 20, such as network routers 28. For example, introduction of network services switch 56 separates routing and associated tasks from other web services platform functionality, thereby allowing network administrators to distribute web services routing functionality and the resources demanded by such routing tasks across many inexpensive nodes in a network environment. Such a configuration allows for rapid scalability in a highly cost efficient manner. Accordingly, embodiments of the present invention allow a network administrator to leverage an enterprise's investment in existing network infrastructure to create a web services network capable of handling large amounts of web services traffic.

In one form, network services switch 56 operates in conjunction with a plurality of additional instances of network services switch 56 installed on existing routing nodes in the network infrastructure or on dedicated devices. The plurality of network services switches depend on one or more instances of network services engine 52 and/or 54 to handle activities requiring persistent storage of data, such as logging, reporting, maintenance and configuration. Unlike the web services networks of the prior art, where the web services platform is associated with and all web services routing occurs at a single point of integration located on a server or cluster or servers in a particular network, the web services network platform functionality of the present invention is distributed across the network environment.

A. Network Services Engine

Network services engine 52, 54 supports all aspects of a web services network, including network and routing node configuration, security, network maintenance, logging and reporting, as well as the handling of routing and associated tasks. As discussed below, network services engines 52, 54 are also operative to support and maintain network services switches 56 associated therewith. In one form, network services engines 52, 54 may be configured to operate in a mode where only a subset of its functionality is enabled. For example, a particular engine, such as root engine 52, may be configured such that it does not perform routing of service action requests and responses. As FIG. 3 illustrates, certain instances of the network services engine 54 are used specifically for gathering reporting data. Such instances are referred to as reporting nodes or servers 58. In some configurations, reporting node 58 is dedicated solely to reporting and logging of data associated with usage of web services network 40, while, in other configurations, reporting node 58 also supports web services routing functionality.

In one embodiment, the functionality of network services engine 54 may be implemented in hardware, software, or a combination of both. In one embodiment, network services engine 52, 54 is an application executed by a server operably connected to computer network 20 (see FIG. 1). The server is a programmable computer executing computer programs, comprising at least one processor, a data storage system, at least one input device, and at least one output device. In one embodiment, network services engine 52, 54 comprises a persistent data store, such as network database 60, 62 respectively. Network databases 60, 62 store web services routing table data, as well as configuration data relating to the operation of web services network 40. Network databases 60, 62 are stored in persistent, nonvolatile memory, such as a hard-disk drive or any other suitable form of persistent memory. In one preferred embodiment, network databases 60, 62 reside on the same respective servers executing the functionality of network services engines 52, 54. However, in another embodiment, a single database server can support multiple instances of network database 60, 62 each associated with a network services engine 52, 54.

Network services engine 52, 54 is operative to maintain and update routing table data for network services switches 56 operably connected thereto. Network services engines 52, 54 are also capable of making database entries on behalf of network services switches 56, such as for service action logging. Network services engines 52, 54 are also operative to share web services network configuration and/or routing data with other instances of network services engine 52, 54 associated with the computer network environment. As discussed below, the routing table data applies to the entire web services network not just a single network services engine. Accordingly, a change to routing table data must propagate through the web services network, affecting every routing node (e.g., engine and/or switch) that enables that network.

Network services engine 52, 54 further supports at least one handler that implements a platform service associated with the web services network. A handler is functionality directed to maintenance, configuration, and/or support of a web services network. In one embodiment, actions associated with handlers are presented as internal web services available on one or more instances of network services engine 52, 54. For example, a handler service action may assist end-users with utilization of web services network 40. For example, a particular handler action, when invoked, provides information to a user describing which web services he has permission to access. Other handler service actions include functionality associated with routing entity requests, entity creator requests, and the like (see below).

As discussed in more detail below, a console application allows network administrators to configure network services engines 52, 54, network services switches 56 and, thus, operation of web services network 40. The console application facilitates configuration of all data required for routing, security and user management. Network services switches 56 depend on instances of network services engine 52, 54 for routing table and other associated data. Network services switches also depend on engines 52, 54 to provide functionality allowing for maintenance, configuration and support of web services network 40. For example, embodiments of network services switch 56 do not store routing table data in persistent memory, but depend on network services engine 52, 54 to provide this information on demand and/or by push updates, as required. Accordingly, configuration of network services switch 56 entails providing a computer network address of a network services engine 54 with which it communicates for routing table and other configuration data.

B. Network Services Switch

Network services switch 56 routes service action requests and responses in the same manner as network services engine 52, 54. In one embodiment, network services switch 56 is further operative to perform other routing-related tasks, such as application-level security. As discussed above, however, network services switch 56 relies on one or more instances of network services engine 52, 54 for non-routing related functionality associated with network 40, such as configuration, maintenance, support, logging, etc.

As discussed above, network services switch 56, in one embodiment, has a small footprint enabling its installation on standard networking equipment, such as network router 28. Although network services switch 56 may run on such lightweight hardware platforms, such hardware platforms must be able to accommodate an operating system and network services switch 56. In one embodiment, the hardware platform should preferably include some form of persistent memory, such as a hard drive or an Application Specific Integrated Circuit (ASIC), allowing for storage of an operating system and an instance of network services switch 56. In one embodiment, network services switch 56 operates in connection with an embedded Linux or Solaris operating system including a Java Runtime Environment supporting all requisite Java networking libraries. In such an embodiment, the hardware platform must also be capable of executing a servlet engine at a reasonable performance level. However, network services switch 56 may be implemented in other programming environments, such as C or any other suitable programming environment. Suitable routing devices include Cisco® Content Services Switches, Nortel® Alteon 180 routers, and the like. Of course, network services switch 56 can be ported to any suitable platform or runtime environment, including service appliances such as Crystal PC® CS200/300, or Hewlett Packard® P4500. To configure network services switch 56, a network administrator must provide the computer network address of the network services engine to which it can make requests for routing table updates, as well as a computer network address of the reporting node to which it sends event logging requests.

One the features enabled by embodiments of the present invention is inexpensive fail over support. It is important that the disruption of a single network node not bring down an entire web services infrastructure. Because it is relatively inexpensive to implement network services switch 56 at existing routing nodes in a computer network environment, it is practical to distribute it in large numbers across the network, thereby enhancing a subscriber's ability to employ automated fail over functionality if a particular routing node fails.

C. Platform Services and Console Application

As discussed above, network services engine 52, 54 supports handlers implementing platform services, such as the registration of end-users and queries for services available to a given subscriber. As discussed above, handler services are web services accessible by the generation of a service action request as any other web service. Accordingly, this configuration allows enterprise customers to integrate platform services into their own systems and applications, as opposed to being forced to access platform services through a third-party application interface. Nevertheless, embodiments of web services network 40 include console application 90 as more fully discussed below. The following also illustrates the platform services offered by network services engines 52, 54.

The console application provides an interface facilitating access to functionality for network administrators and other users of the web services network enabled by the present invention. For example, console application 90 provides the user interface through which web services are configured, registered, and discovered, by which access to those services may be controlled, by which network services engines 54 and switches 56 are configured, and by which the user rights of those participating in the network may be administered. In one embodiment, the console application further provides access to service activity reporting capabilities and customer service functionality.

Console application 90 presents the user interface by which authenticated end-users interact with and/or configure the web services network of the present invention. In one embodiment, console application 90 is a web-based application executed on a server or other computing device operably connected to the computer network environment. In another embodiment, the console application may reside on a desktop computer 22 associated with a network administrator. As discussed above, the functionality allowing for maintenance, configuration, support and other administrative tasks associated with web services network 40 is, in one embodiment, available as web services residing on one or more instances of network services engines 52 and/or 54. In one embodiment, a set of SNMP interfaces allow access to such administrative functionality without the use of console application 90. To implement an end-user command, console application 90 generates an appropriate service action request and transmits it to a network services engine 52 or 54. Console application 90 is further operative to allow for configuration of all nodes associated with a web services network concurrently or individually.

Console application functionality can be divided, for didactic purposes, into several interrelated areas or realms. The console application can include all or a subset of the functionality described below. For example, although subscribers, in one embodiment, must formally subscribe to a service, other embodiments allow for the utilization of services without formal subscription protocols.

1. Basic Entity Administration

For illustrative purposes, the various participants and components in a web service network will be referred to herein as routing entities or entities. In one embodiment, the web services functionality supports the following entities:

Organizations: An organization can refer to an individual, a department within an enterprise, an entire enterprise, or any other entity. Both subscribers and publishers are types of organizations within the context of the console application and a web services network. A subscriber is an organization running applications that utilize one or more web services. A publisher is an organization defining and maintaining at least one service. All end-users are considered members of an organization. The words "subscriber" and "publisher" are used as modifiers for end-users, allowing the console application to present different interfaces based on the specific role of the user who is currently logged on.

Services: A service is a web service or application maintained by a publisher. A service includes one or more actions. These are web services that have been or will be integrated into a web services network according to the present invention.

Actions: The functionality offered by a service is divided into actions, each of which represents a discrete activity that can be performed by a publisher on behalf of a subscriber in response to a service request.

End-Users: An end-user is an individual or computing unit logged into host node (e.g., client computers 22 or servers 24) and accessing the console application. End user also refers to individuals or entities whose use of a subscriber application results in a service action request being transmitted over the web services network of the present invention. Those end-users of the console application possessing adequate permission levels carry out administrative tasks with respect to each of these routing entities. Such tasks include searching, browsing, creation of new entities, editing existing entities, and deletion of obsolete entities.

2. User Account Management

The console application also facilitates creation and management of user accounts. Each user account has associated therewith a set of access privileges to the functionality available over the console application or other administrative tool. An IT administrator may have privileges to create and modify user accounts and entities. An administrative end-user associated with a subscriber may also have the ability to modify or create user accounts within the subscriber realm. An administrative end-user associated with a publisher may have access privileges to register or delete services or actions within the publisher's realm. In one embodiment, a user account further includes access privilege information relating to specific services or actions available to the corresponding end-user. The console application supports similar capabilities available with respect to entities: searching, browsing, creation of new accounts, editing existing accounts, and deletion of obsolete accounts.

3. Reporting

The console application also allows users access to a variety of reports supplying information on various aspects of web service usage. Both graphical and text-based reports can be supplied, constrained, and organized using a variety of parameters, including specification of included entities, end-users, and date ranges.

4. Advanced Entity Administration

One embodiment of the web services platform enabled by the present invention allows for monetization of web services. To facilitate monetization, the console application supports additional types of entities and/or entity attributes, in addition to the basic ones described above.

Pricing Models: A pricing model consists of one or more types of charges, as well as a number of parameters (such as price) that provides the means by which amounts owed for service usage can be computed. The console application allows authenticated end-users to create, edit, and delete pricing model entries.

Service Offers: When a publisher offers a subscriber (or group of subscribers) use of a service, this is accomplished by creating a "Service Offer." The Service Offer, in one embodiment, comprises a pricing model, a unique identification (Id) of the Service being offered, and a list of subscribers to whom it is being offered. Additional terms and conditions may be specified as well. A subscriber gains permission to use a service by accepting the proffered Service Offer associated with it. Users create, edit and delete service offer entries using the console application. In one embodiment, when Service Offer detail pages are viewed by administrators, the number of subscribers accepting that Service Offer are shown.

Organization Groups: The console application also allows publishers to place organizations in named groups. These groups are then used to establish access control rights for services provided by those publishers.

Access Control: Publishers can control access to the services they provide. The process of administering such access controls is also known as "provisioning."Once a subscriber accepts a service offer, it is incumbent on the administrator of the relevant service to provide access in a timely manner. This is done by placing organization and organization groups ("org groups") onto the access list maintained for that service.

Additional Computed Fields: In addition to the various computed values displayed in entity detail views as specified above, several other values can be computed and displayed:

1) The number of subscribers to a service, for example, can be displayed. This is defined as the sum of all subscribers to all Service Offers that include the service.

2) The average number of requests per day can be shown for both services and service actions.

3) A service action may optionally have a counter associated with it that is incremented each time the service action is used. The value of this counter is available as a computed field in the service action detail and list pages. Users are able to reset the counter manually, through the service action detail page, or to specify a standard timer reset interval (defaults to 24 hours) through the service action detail page.

Configurable List Pages: The list view of the Entity Administration Page can be configurable, allowing power users to pick which fields actually appear on the page. Such users will be able to select from amongst a number of optional fields that may be included as columns in the view. For services, one of the optional fields will be "number of Subscribers" (as described in the bullet point above) and "average number of requests per day." For Service Actions, one of the optional fields may be "average number of requests per day."

5. Discovery

The console application also facilitates and supports discovery of web services. Discovery is the process by which subscribers search for and browse services in order to make utilization decisions.

6. Subscription

The console application also supports subscription to services. Subscription is the process by which subscribers actually work through the process of signing up to use a service. In one embodiment, all of the various costs, terms, and licensing agreements are presented in a graphical user interface presented by the console application. The process culminates in the subscriber either accepting the terms of a service offer or returning to the discovery portion of the application. In one embodiment, acceptance of a subscription ultimately generates a routing entry allowing service actions requests generated by the subscriber to be routed to the service.

In one embodiment, a review mechanism allows subscribers to both provide a numerical ranking of services (on a scale of one to ten) and provide text reviews of services to share with the rest of the subscriber community. Discovery and administration detail views are extended to include access to reviews. The number of reviews of any given service are provided on the detail page itself, with a link to the actual reviews. The ranking attributed to the service is displayed alongside the review. Both number of reviews (as a link to the reviews) and average ranking are optional fields in the list views of the services.

7. Monitoring

In additional to the reporting functionality described above, the console application provides administrators with data concerning certain vital operational aspects of a web service network. Users can gain quick access to summary information on uptime and performance for any given service and/or service action. In one embodiment, the console application provides this information within the context of Service Level Agreement (SLA) compliance as it pertains to specific service offers. For example, if a subscriber is viewing performance summary information on a given service that is not in keeping with the SLA associated with the service offer accepted by that subscriber, the console application explicitly informs the subscriber of this violation in the terms of the SLA.

8. Notifications

The console application and associated functionality of network services engines 52, 54 further supports notification of end-users. In some cases, is not sufficient to provide such information solely through monitoring screens—users must be immediately notified. For example, the console application supports notification of subscribers if a service or service action fails beyond a threshold number of times in a given period. In one embodiment, such notifications are in the form of e-mail, pager and/or cell phone calls.

9. Inter-Enterprise Web Services Support

In one embodiment, the console application further supports access to a hosted inter-enterprise platform service residing remotely from the enterprise. The inter-enterprise platform allows a plurality of separate web services networks to "cross-pollinate" each other by providing a central, public access point through which administrators may register services, as well as discover and/or subscribe published web services of other enterprises.

Inter-enterprise platform functionality falls into one of two broad categories—common publishing and common discovery. Common publishing is the process by which information on services existing in disparate web services networks is provided to the platform. Common discovery is a set of features that allows console application users to discover services published into the platform using the same interface utilized in discovering "local" services. In one embodiment, common publishing functionality is available to Master Administrators and Network Administrators only, while common discovery functionality is available to all end-users.

Administrators can publish web services to the platform by identifying specific service offers they wish to make available through the inter-enterprise platform. All of the information regarding these service offers is then transmitted to the platform site via the service actions that constitute the common publishing segment of the service. This transmission of data will by necessity ripple through the dependency tree in which the service offer resides—for instance, all service actions and pricing models associated with service being offered are transmitted along with the service offer entity itself. The implications for the discovery portion of the console application are less involved. In one embodiment, the console application offers users the option of whether they wish to have remote services displayed and provides a means for differentiating between remote services and "local" services.

10. Administrative Dashboard

In one embodiment, the console application features a screen containing summary information. Immediately after logging into the console application, a user is presented with a configurable "dashboard" screen that includes a summary of information on web service networking management issues relevant to the user. An example of a typical field that might be displayed on the dashboard is the number of service action failures attributed to services associated with the user's organization.

11. Security

The Console application, in one embodiment, is accessed solely through password-protected user accounts. The following security-related features may also be included:

All users of the console application log on through a common dedicated page.

Logons are invalidated after some reasonable amount of a time (say, two hours).

Users are not able to evade the log-on page by directly accessing other pages in the application.

Users are able to retrieve lost passwords via e-mail.

12. User Roles

In one embodiment, the console application supports various user roles that can be associated with end-users. A user role is a predefined set of permissions and access privileges enabling and/or enforcing a role for a particular end-user or group of end-users. In one embodiment, such user roles include:

Master WSNO (Web Service Network Operations) Administrator: The Console defines one user with this role upon installation. In one embodiment, no additional users of this type may be created, and the single user of this type may never be deleted. The Master WSN Admin role has all permissions. It is the only role with the ability to create other admin accounts. A user in this role is referred to as the "master admin."

Network Operations Administrator (NOA): This role includes the same privileges as the Master WSNO, except for the ability to create other NOA accounts. A user in the role is referred to as a "net admin."

Organization WS (Web Service) Administrator: Organization Administrators have rights to view, create, edit and delete entities "owned" by their organization, including user accounts below the Administrator level. A user in this role is referred to simply as an "admin." Admins are always classified as being either "publisher admins" or "subscriber admins." This is important because the console application presents publishers and subscribers with different user interfaces adapted to their respective roles in administration of the network.

WS Specialist: A Web Service Specialist has rights to view or create and edit most entities belonging to his Organization. Exceptions to this are user accounts and the entity representing the Organization itself. A user classified as a Specialist may also view services and actions defined by other Organizations, as well as Service Offers that have been extended to the Organization to which that user belongs. Specialists should also be classified as either Publishers or Subscribers.

Visitor: A visitor account provides the rights to view all of the same entities available to a Specialist. A visitor does not, however, have "edit" or "delete" rights of any kind.

Of course, a wide variety of user roles and permission sets may be employed in connection with the present invention.

13. Web Services Network Topology

In one embodiment, the subscriber view presented by the console application allows end-users to gain insight into network topology and other infrastructure considerations associated with service actions. In one embodiment, each service action includes a "distance" attribute, a computed field characterizing the proximity of a subscriber's web service consuming applications to the infrastructure on which a given service action actually executes. In one embodiment, the distance attribute may have one of three values: 1) "local" (published by and subscribed to by the same organization); 2) "global" (published by and subscribed to by different organizations that are part of the same web services network); and 3) "peered" (provider and subscriber application are on different web services networks).

In addition, the web services network according to one embodiment of the present invention includes functionality allowing for a determination of the number of network hops taken by a service action request from a subscriber node to a publisher node. In one embodiment, network services engine 54 includes "traceroute" functionality to determine the number of hops between it and the publisher node corresponding to a service action request. In addition, the subscriber node includes traceroute functionality to determine the number of hops between it and network services engine 54 and report such information to network services engine 54. This configuration makes it possible to build up a body of statistical data that will allow administrators and subscribers to make reasonable estimates of the number network hops typically sitting between a request's source and its destination.

D. Network Architecture

FIG. 3 sets forth an embodiment of the web services network including root engine 52, fail over root engine 53, network services engines 54, reporting node 58, and network services switches 56. As with FIG. 2, the lines between routing nodes represent routing table dependencies. The lines included between network services switches 56 and reporting node 58 represent the flow of data associated with the logging and reporting functionality described herein.

An important aspect of the network architecture of the present invention is functionality supported by network services engines 52, 54 and switches 56 allowing for efficient distribution of routing table data across a web services network across all routing nodes. In one embodiment, all nodes associated with the network (e.g., network services engines 52, 54 and switches 56) maintain their own respective routing tables and are capable of routing any service action request or response. As to network services engines 54 such local routing tables are contained in databases 62, whereas for network services switches 56 the routing tables, in one embodiment, are maintained by suitable data structures in Random-Access Memory (RAM).

Embodiments of the present invention avoid the often unneeded overhead associated with maintaining a comprehensive routing table on each routing node. For example, according to typical usage patterns, it is likely that subscriber systems (such as client computers 22 or servers 24) that make use of the same service are likely to transmit service action requests over the same network service switch 56 or group of collocated switches. Since only these switches route requests for a given service, there is no need for other (potentially numerous) network services switches 56 in network 40 to have routing table entries related to that service in their respective local routing tables. Accordingly, each routing node of web services network 40 maintains a local routing table consisting of a subset of a global or comprehensive routing table. In one embodiment, root network services engine 52 maintains a global routing table to allow for distribution of routing table data to various routing nodes on demand. As more fully described below, when a routing node is confronted with a routing entity not contained in its local routing table, it transmits a routing entry request to its parent node to provide the requisite routing data. In one embodiment, when a network services switch 56 experiences a "routing fault," it transmits a routing entry request to a parent network services engine 54 to provide the requisite routing entry. Accordingly, through use, network services switch 56 obtains and stores on its local routing table the routing data required to support its routing responsibilities in web services network 40.

Similar to network services switch 56, network services engine 54 possesses whatever routing table entries are necessary to satisfy any service action requests it has received. In addition, network services engine 54 further contains the routing table entries required to support switches 56 for which it is responsible. In addition, the local routing tables residing on network services engines 54 are also updated on demand in response to both service action requests and the need to support routing entry requests of network services switches 56 associated therewith.

To maintain routing table data across web services network 40, the nodes comprising the web services network are arranged in a tree structure where, in one embodiment, network services switches 56 occupy the leaf nodes (see FIGS. 2 & 3) and network services engines 52, 54 occupy non-leaf nodes of the tree structure. In one embodiment, this network architecture and the nodes comprising it possess the following properties and functionality, or a subset thereof:

New routing table entries may be created at any non-leaf node in the tree.

When a new routing table entry is made, it is pushed up the tree in such a way that all ancestors of the node at which the entry is made rapidly acquire the contents of the new entry.

As a consequence of the two points listed above, the root node will always have a complete global routing table.

When a routing fault occurs (e.g., routing entity not found in local routing table), the node at which the fault occurred will ask its parent to provide the missing routing table entries. If the parent also lacks the required data, it will ask its parent, and so on. If the request fails at the root node, the routing fault is declared final and an exception is propagated back to the node at which the original routing fault occurred.

Fault tolerance is supported by this tree structure in the following ways: If a leaf node goes down (OS or hardware failure), requesters can fail over to any other leaf node in the network. If a non-leaf node goes down, the network can be reconfigured around that node simply by "pointing" the downed node's children at the downed node's parent. As FIG. 3 shows, the root node 52, in one embodiment, is replicated by failover root node 53 for purposes of supporting fail over functionality. In one embodiment, if a service action request to root node 52 times out, engine 54 or switch 56 is configured with the IP address of failover root node 53 and accesses it. Such a fail over may generate an automatic notification to the network administrator.

While new routing table entries need only be pushed up the tree, routing table changes are pushed both up and down the nodes in the tree, to ensure that all nodes possessing the changed entries are made current as rapidly as possible. For instance, if a particular Subscriber is granted access to given service action, then the Subscriber must be allowed to access that action through any routing node on the network.

The network architecture described above allows for certain advantages. For example, the addition of new routing nodes, especially network services switches 56, is fairly straightforward, requiring little time for configuration. Rather, the routing node acquires the requisite routing table entries over time as it responds to service action requests and/or receives routing table updates. As discussed below, the network architecture described above facilitates merging of two separate web services networks.

In addition, although the web services networks illustrated in FIGS. 2 and 3 show a plurality of network services engines 52, 54, the web services network architecture can comprise a single root network services engine 52 operating in connection with at least one network services switch 56. Networks will tend to gain deeper topologies and additional network services engines 54 due to mergers. Specifically, as smaller networks are merged to form larger networks, the number of routing layers present will gradually increase. In a typical configuration involving large web services networks, the routing functionality of root network services engine 52 will be disabled to free up processing power for the administrative and maintenance tasks discussed herein. Moreover, while reporting functionality can be incorporated into root network services engine 52 or other network services engines 54, particularly busy networks may include a dedicated reporting node 58, as shown in FIG. 3.

Figure 4:
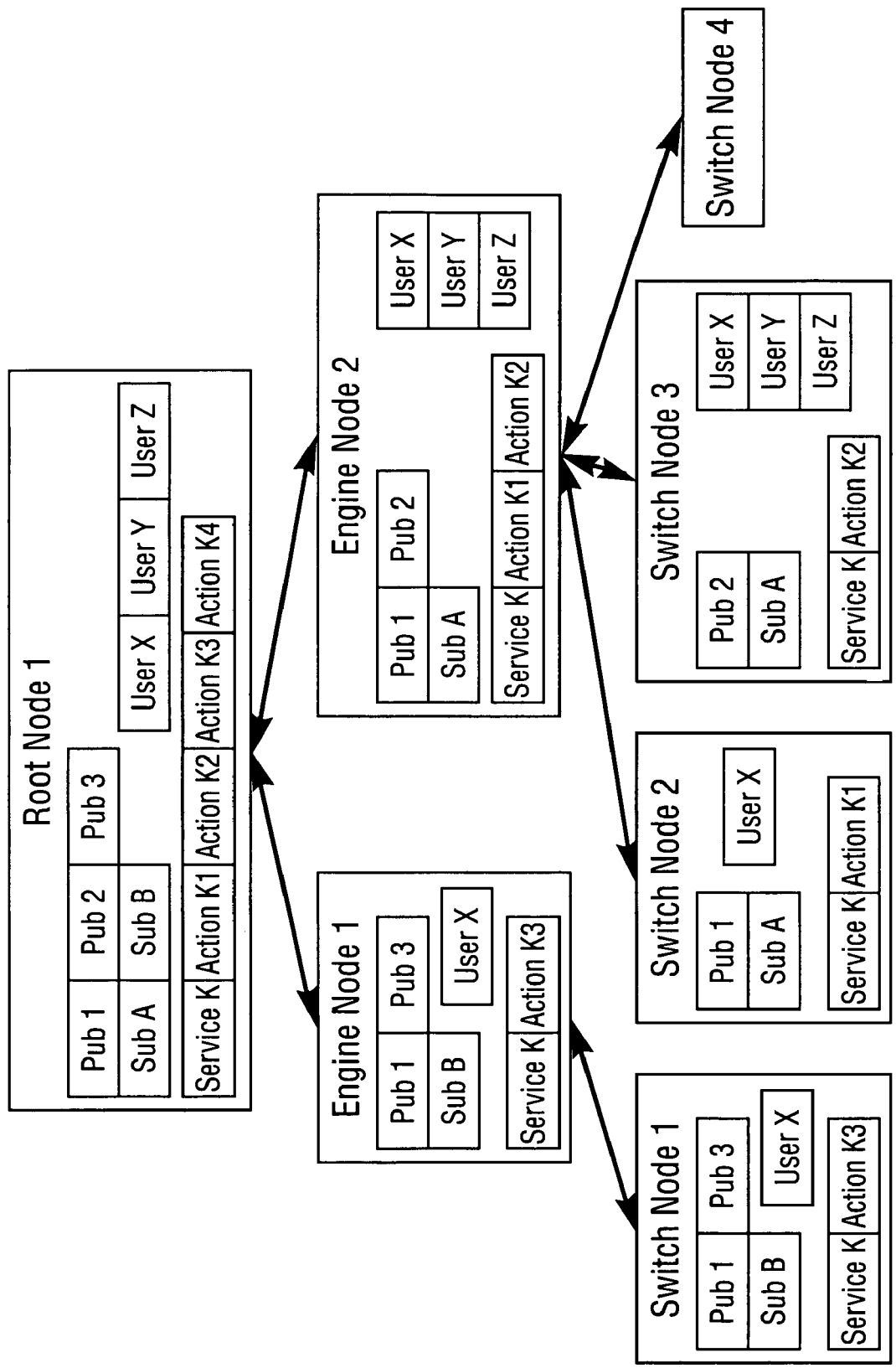
FIG. 4 is a diagram illustrating a possible state for routing tables across an embodiment of the web services network of the present invention.

For didactic purposes, FIG. 4 illustrates a possible routing table configuration state for an (artificially) small web services network according to the present invention. Each box in the above diagram represents a routing node. The interior boxes 72 represent routing table entries. The non-directed line segments denote flow of data, and imply parent/child relationships. As FIG. 4 provides, the local routing table of each node is the union of the local routing tables of its child nodes. For example, Engine Node 2 54 has routing table entries for Action K1 and Action K2 because requests for these actions have passed through its child nodes. It lacks a routing table entry for Subscriber B because none of its children have ever received a service action request from Subscriber B. Switch Node 4 is an example of a routing node newly introduced into the network or recently re-initialized to erase the routing table data stored in RAM. As discussed more fully below, when Switch Node 4 receives its first service action request, it transmits a routing entry request to its parent node, Engine Node 2, for the routing table entries required to fulfill that request and enter them into its local routing table.

E. Unique Network Identifications

An embodiment of web services network 40 features unique network identification functionality to facilitate a subsequent merging of two separate networks (see Section II.D., below). Two different instances of network services engine 52 on two different web services networks can have routing table entries that use the same identifications to refer to two different entities, thereby rendering merging of the networks quite problematic. For instance, Subscriber A may have an identification of 122 on a first network, while Subscriber B may have the same identification on a second network. Moreover, Subscriber A may be registered on both networks, possessing an identification of 122 on the first network and an identification of 235 on the second network.

Accordingly, to facilitate merger of two separate networks, embodiments of the present invention implement protocols and functionality resulting in the generation of globally unique routing entry identifications when new routing entities are added to the global routing table of a network. In one embodiment, identifications for publishers, subscribers, and end-users are globally unique in that each identification is not used to identify any other entity of the same type. Services are unique per-Publisher, while Actions are unique per-Service.

1. Assignment of Network Operator Identifications

In one embodiment, each network operator (typically, a single enterprise) of one or more web services networks is assigned a globally unique identification. In one embodiment, an automated or manual process is employed to assign such identifications to network operators before deployment of the network. In one form, this unique network operator identification is part of the configuration of the corresponding network's root engine node and becomes part of that node's persistent store.

2. Assignment of Web Service Network Identifications

Those individuals responsible for web service network configuration and administration within a network operator organization assign an identification to each web services network they deploy and configure. The values of such web service network identifications are important only in that they are unique within the realm of that network operator organization, and may be decided upon in a fairly arbitrary fashion. Each web service network identification is applied to the configuration of each non-leaf node in the respective network and is persistently stored by each non-leaf node. Administrators may change web service network identifications (though this requires changing the network identification applied to each node in the network), to allow the uniqueness constraint to be followed when two networks are merged—i.e., every network maintained by a network operator has an identification different from all other networks maintained by that operator.

3. Globally Unique Identification Generation

In one embodiment, the following protocol is used to generate globally unique identifications for routing entities. Each identification comprises four delimited parts, each of which is an integer: 1) The Network Operator Identification (above); 2) The Web Service Network Identification (above); 3) An Entity Identification (see below); and, optionally, 4) a time stamp.

An entity identification uniquely identifies a routing entity within a particular web service network. As discussed below, entity identifications are generated at root network service engine 52, which makes available over network 40 an entity creator service. In one embodiment, the entity creator service includes actions corresponding to each routing entity type. Accordingly, the console application is configured to transmit entity creator requests to the root node 52. In one embodiment, the timestamp consists of the last four digits of time expressed down to the millisecond at which the identification is generated. In other embodiments, the time stamp may be replaced with a random number generated by any suitable random number technique. However, any suitable technique for generating an arbitrary value may be used.

Accordingly, application of the foregoing algorithm results in an identification in the following form: aaa.nnn.xxx.mmmm, where aaa is the Network Operator Identification, nnn is the Web Service Network Identification, xxx is the Entity Identification, and mmmm is the timestamp. However, any number of digits for each component of the entity identification may be employed.

F. Inter-Network Peering Service

In one embodiment, the web services network platform includes inter-network peering functionality allowing disparate web service networks to interoperate as if they had been merged. Such inter-network peering functionality allows for the creation of applications and composite web services that are based on both a web services network according to the present invention and other, disparate web services networks. Specifically, such functionality facilitates the incorporation of such "externally networked" services into applications and composite web services. The web services network platform, in one embodiment, accomplishes this by identifying service requests that must be routed to externally networked services and by handling any handshake behaviors required to take into account the technological peculiarities of these external networks. This functionality is referred to as "forwarding," while the processing of routing the response back through the web services network 40 to the requestor is referred to as "receiving." Examples of such external networks with which inter-network peering functionality may have to communicate include: Slam Dunk Networks, Flamenco Networks, Grand Central Networks, TransactPlus Networks, and Commerce-Quest.

II. Operation

A. Routing of Service Action Requests and Responses

The routing of service action requests and responses can rely on standard network protocols, such as SOAP, HTTP, XML and the like. A routing node (e.g., network services engine 54 or switch 56) receives a service action request including a header identifying the source and an action. The routing node scans its routing table for the computer network address associated with the action. The routing node then opens an HTTP connection with the publisher system (e.g., server 24) corresponding to the computer network address and pushes the request to it. For synchronous service action requests, the HTTP connection remains open until the publishing node responds or the request times out. For asynchronous requests, the HTTP connection is closed. The subscriber node issues a request to retrieve the response at a later time. Still further, for service action requests designating a publisher beyond the firewall or domain associated with the network infrastructure, embodiments of the present invention open a secure communications path using standard techniques, such as Secure Sockets Layer, HTTPS or other suitable technologies.

1. Routing Entities and Routing Entries in Global Routing Table

As discussed above, the web services network according to one embodiment operates in an environment including five routing entity types: 1) subscribers, 2) publishers, 3) services, 4) actions, and 5) end-users. As discussed above, the web services network generates a unique routing entity identification for each entity as it is registered with the network (see above). In one embodiment, end-user routing entities are registered on the network in association with a set of profile values, including, for example, 1) an end-user routing entity identification; 2) a subscriber identification (the routing entity identification of the subscriber to which the user corresponds); 3) the user's name; and 4) the user's email address,-. The profile information associated with an end-user routing entity allows publishers to provide and customize services on a per end-user basis. Accordingly, the profile set can include any type of data deemed necessary by a publisher for a particular service and/or action.

A global or local routing table comprises one or more routing entries. Each routing entry has two main components: a key and a value. In one embodiment, the key comprises the following elements: 1) Network Operator ID, 2) Web Service Network ID, 3) Action Name, 4) Service Name, and 5) Subscriber ID (a unique routing entity identification generated when the subscriber is registered on the network). The value of a routing entry, in one embodiment, comprises the following elements: 1) action_id (a unique routing entity identifier for an action); 2) an action_type flag (indicating whether the action type is internal or external; an internal action type corresponds to an action associated with a network platform service (e.g., routing entity request service, entity creator service, etc.), while an external action type identifies an action associated with a publisher); 3) action_url (the URL where the published service/action is located; the URL may comprise a DNS hostname or an IP address and, optionally, a port number); 4) service_id (a unique routing entity identification corresponding to the service associated with the action); 5) service_type (indicate a 'legacy service' that is simply logged for reporting purposes or normal web service); 6) publisher_id (a unique routing entity identification corresponding to the publisher of the service); and 7) is_valid_subscription (a Boolean value indicating whether the subscription associated with the subscriber_id is valid).

The key and value components of a routing entry may include a variety of different elements, relationships and associations to achieve various objectives. For example, the key may contain an end-user routing entity identification to allow for creation and enforcement of subscriptions at the end-user level. In one embodiment, an end-user name and a subscriber name, in combination, may map to an end-user routing entity identification in the global routing table.

In one embodiment, a service action request includes a header containing the key elements associated with a routing entity (in one embodiment: action_name, service_name, subscriber_id, web_service_network_id, and network_operator_id). In one embodiment, the service action request header further includes a transaction identification used in connection with the transaction support services described above. Stilt further, a service action request header may further include a message identification generated by a subscriber to facilitate handling of asynchronous service action requests.

In one form, the routing nodes (e.g., engine 54 or switch 56) perform error checks on the service action request. For example and in one embodiment, the routing node returns an error XML response, if 1) it cannot parse the XML request, 2) the request does not contain sufficient key information for a routing entry lookup, or 3) a key is invalid (e.g., a key value could not have been generated by the network). Assuming no such errors, if the subscription is valid, the routing node routes the request to the publisher identified in the request header by sending the XML service action request using the action_url value associated with the routing entry. The publisher of the service at the action_url processes the request, executes the corresponding action, and returns a response to the routing node. The routing node then returns the response to the subscriber system that originated the request. If the subscription is not valid, the routing node returns an XML error message indicating that no subscription exists for the service.

Figure 5:
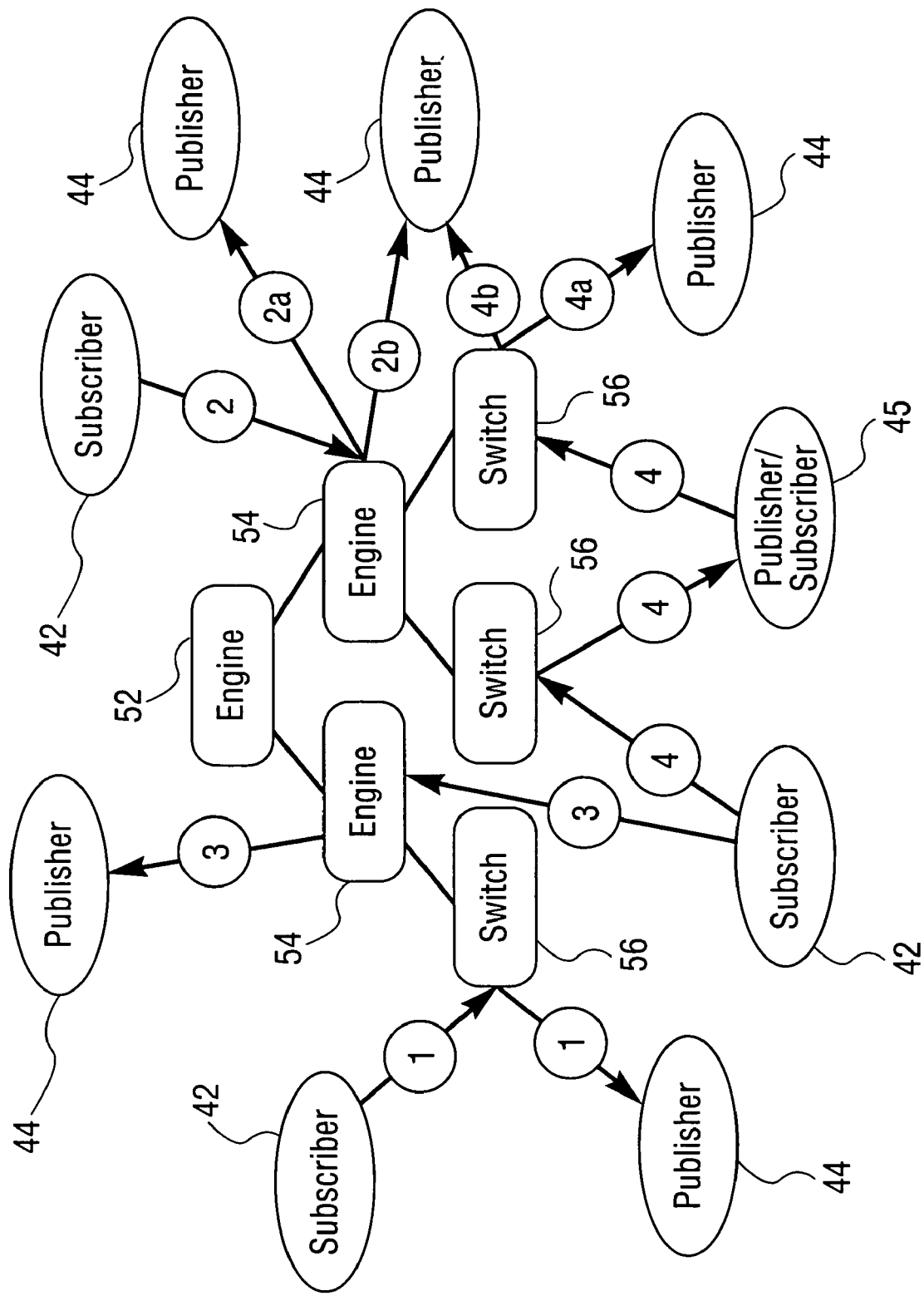
FIG. 5 is a functional block diagram showing various scenarios associated with routing of service action requests.

FIG. 5 illustrates data flows corresponding to four possible scenarios involving the routing of service action requests and responses according to an embodiment of the present invention. In a first scenario, a subscriber node 42 transmits a service action request to network services switch 56 (FIG. 5, 1a). Network services switch 56 processes the header associated with the request, transmits it to the publisher node 44 designated in the header (1b), and logs the service action request. Subsequently, publisher node 44 receives the service action request, generates a service action response (in one embodiment, the response is an XML response), and transmits it over the web services network. Network services switch 56 receives the service action response, processes the header appended to the response, logs it, and transmits it to the subscriber node 42 designated in the header. In a second scenario, subscriber node 42 transmits a service action request directly to network services engine 54 (3a), which routes the request to the publisher node designated in the header appended to the request (3b).

Other scenarios are also possible. For example, in a third scenario, subscriber node 42 transmits a service action request to network services engine 54 (2a), which routes the request to the publisher node 44 identified in the header associated with the request (2b). Publisher node 44, however, fails to process the request; after the response has timed out, network services engine 54 transmits the service action request to an alternate or fail over publisher node 44 for processing (2c). Lastly, in a fourth scenario, subscriber node 42 transmits a composite service action request for processing to network services switch 56 (4a). Network services switch 56 routes the composite request to publisher node 45 (4b), which process the composite request and issues service action requests via network services switch 56 to the appropriate publisher nodes 44 (4c, 4d1, 4d2). Publisher nodes 44 process the requests and respond to publisher node 45, which constructs a composite service action response.

B. Routing Table Maintenance

Embodiments of the present invention further include novel protocols and functionality to efficiently enable and support the distributed network architecture described herein.

1. Routing Entry Requests

As discussed above, new routing table entries are added to local routing tables on demand. When a routing fault occurs at a routing node, that routing node utilizes a routing entry query service available on a parent network routing service engine to update its routing table and add the missing entry. In one embodiment, the routing entity request service has an action corresponding to different entity types (e.g., publisher, subscriber, service, action, end-user). The purpose of each action is to provide all data relevant to an entity of that type. In one embodiment, routing entity requests are XML requests transmitted to the parent node. If the parent node lacks the required routing table entry, it passes on the same service action request it received from its child node.

Figure 6:
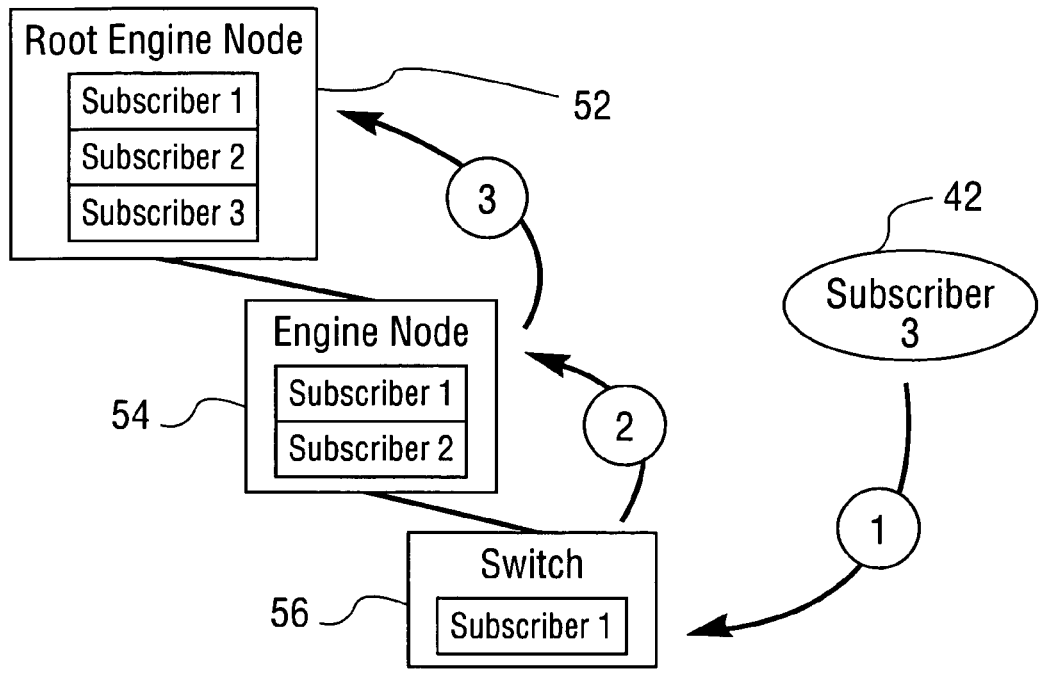
FIG. 6 is a functional block diagram illustrating the process flow associated with a routing entry request.

FIG. 6 illustrates the process flow associated with a routing entry request. As discussed above, a routing node that receives a service action request including a routing entity not contained in its local routing table obtains the requisite routing table entry from a parent node. In one embodiment, subscriber node 44 [Subscriber 3] transmits a service action request to network service switch 56 (FIG. 6, #1). The header appended to the request contains an identifier for Subscriber 3, the source of the request. Because the local routing table residing on network service switch 56, however, does not contain a routing table entry for Subscriber 3, switch 56 experiences a routing fault when it attempts to process the request. When this occurs, switch composes a routing entry request to its parent engine node 54 (FIG. 6, #2). In one embodiment, the routing entry request is a "Get Subscriber" action within the "Routing Entity Query" service available on parent engine node 54.

In this example, parent engine node 54 has similarly never been tasked to route requests involving Subscriber 3 and Subscriber 3 was not added at this particular engine node. Accordingly, it also lacks the information on this routing entity, and must forward the "Get Subscriber" request to its own parent node—in this case, root engine node 52 (FIG. 6, #3). Because root engine node 52 maintains a global routing table, it is able to fulfill the request, assuming a routing table entry exists at all. The requesting node(s) processes the resulting service response, using the encapsulated data to update its local routing table. Network services switch 56 may then process the service action request.

2. Introduction of New Routing Table Entries

When a new routing table entity (Subscriber, Publisher, Service, Action, or End-User) is added to web services network 40, a routing table entry is created in the global routing table on root engine node 52. In one embodiment, new routing table entries are added through any non-root engine node in the network. In other embodiments, new routing table entries may be added directly to the global routing table of root engine node 52. As discussed more fully below, new routing table entries are entered into the local routing table of a network services engine 54, and then distributed to other local routing tables of parent nodes continuing up to root engine node 52.

In one embodiment, the creation and configuration of a routing entity is implemented by a web service. In one embodiment, the routing entity creator service includes actions corresponding to the different routing entity types supported by the network. For instance, adding a new publisher can be accomplished by composing a request to the "Add Publisher" action of the routing entity creator service and submitting that request to any non-root node in the network. As discussed above, console application 90 includes functionality facilitating the generation of such requests.

A network services engine that receives a routing entity creator action request fulfills the request by making the required insertions into its routing table database and then forwarding the request to its parent node. The parent node then forwards this request to its parent, and so on until all of the node's direct ancestors, including the root node, have had the new entry added to their respective routing tables. Once this process is complete, the new entry is considered to have been added to the global routing table.

As discussed above, adding a routing entity to a network involves generating an identification that will be used to identify that entity as represented in the routing entries of the global routing table. In one form, root engine node 52 has sole responsibility for generating routing table entry identifications, although new entities may be added at any non-leaf engine node 54. Accordingly, as part of the process of serving a request to add a routing table entity, an instance of network services engine 54 makes a request to the root engine node 52 in order to obtain a routing entry identification for the new routing entity. In one embodiment, generation of routing entry identifications is a web service available on root engine node 52 and includes an action allowing for the generation of unique identifications (see Section I.E., supra).

Figures 8, 9:
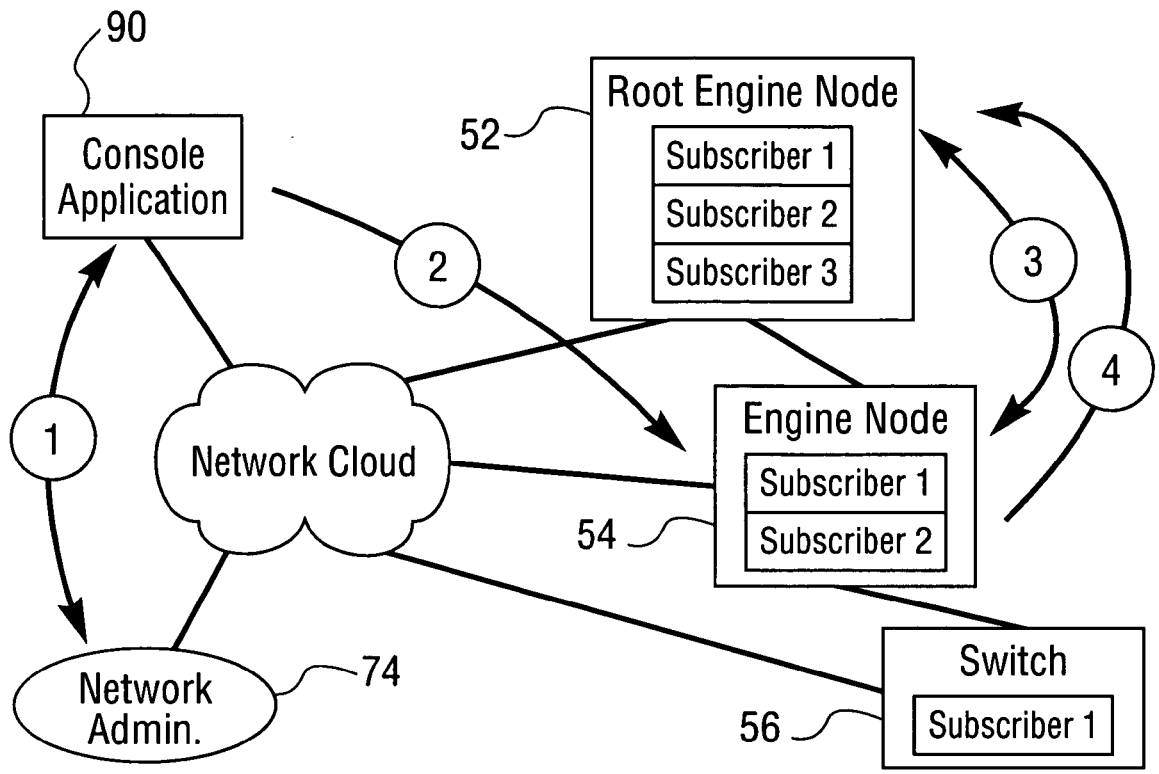
FIG. 8 is a functional block diagram setting forth a process flow associated with routing table maintenance.
FIG. 9 is a table illustrating a routing matrix according to an embodiment of the present invention.

FIG. 8 illustrates the addition of a routing entity into web services network 40 according to one embodiment of the present invention. A network administrator 74, for example, accesses console application 90 to add a new publisher to the network (FIG. 8, #1). Console application composes a "Add New Publisher" action request and transmits it to network services engine 54 (FIG. 8, #2). Network services engine 54 responds to the request by issuing a generate identification action request to root engine 52 to provide a new publisher identification (FIG. 8, #3). After root engine 52 generates a publisher identification and responds to the request, network services engine 54 updates its local routing table and transmits an "Add New Publisher" request to its parent node (FIG. 8, #4). This request is processed at each node and propagates up the tree structure until it is received by root engine node 52, which updates the global routing table. Note that network services switch 56 plays no role in this process. Its local routing table will not be updated to include the new publisher until it issues a routing entity request in response to a service action request involving the new publisher.

3. Updates to and Maintenance of Routing Table Entries

Just as routing table entry acquisition, above, relies on a service, maintenance of routing table data associated with a web services network relies on a similar service available on network services engine 52 or 54. A distinction is the direction taken by such service action requests. In the case of routing table entry acquisition, routing entry requests flow exclusively from child nodes to parent nodes. In the case of routing table entry maintenance, however, routing maintenance requests also flow from parent nodes to child nodes. In one embodiment, network services engine 52, 54 support a routing entry updater service having actions corresponding to each of the routing entity types discussed above. Each action is responsible for handling updates for a corresponding entity type. In order to provide a child node with routing table entry updates, its parent will simply invoke this service, generating an action request corresponding to the type of entity for which it is providing an update.

Figure 7:
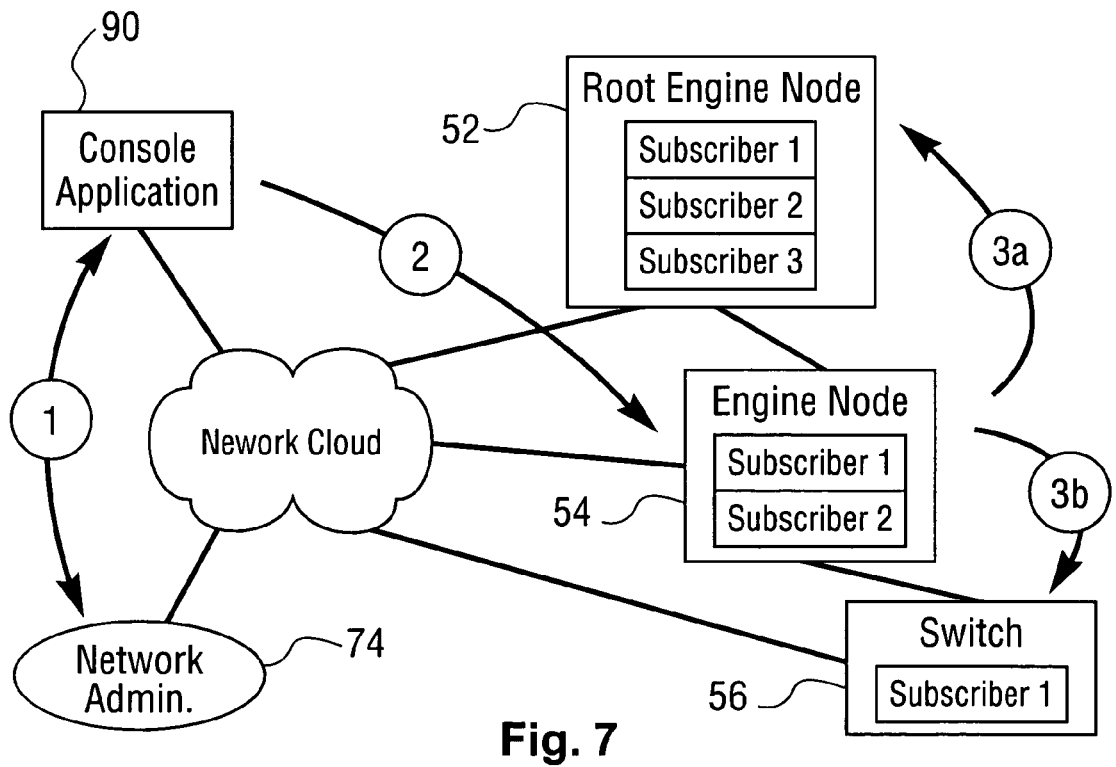
FIG. 7 is a functional block diagram setting forth an exemplary process flow associated with routing table updates.

FIG. 7 illustrates a use case where an administrator 74 accesses console application 90 to update routing or related data associated with a routing entity (FIG. 7, #1). For instance, if a subscriber is provided with permission to access a newly offered web service, the data describing those permissions must be available to every node on the network. Console application 90 generates a request for a routing table change and transmits it to network services engine 54 (FIG. 7, #2). Network services engine 54 receives the request, updates its local routing table and passes the update request on to its parent node (here, root engine node 52) and its child network services switch 56 (FIG. 7, #3*a*, 3*b*). As FIG. 7 shows, the routing entry update request propagates up to root engine node 52, which updates the global routing table.

Subsequent updating of the local routing tables of other routing nodes in other branches of the tree structure occur during routine routing table maintenance performed by non-leaf network services engines 52, 54. Upon initialization and periodically in a background process, non-leaf network services engines 52, 54 monitor the status of their own respective local routing tables, as well as the local routing tables of their respective child nodes. Whenever a network services engine 54 discovers a routing table entry that is out of date, it will generate a Routing Table Updater service action request and submit that request to the appropriate child node.

In one embodiment, the data required by the parent routing node to make determinations as to what entities in which children's routing tables need updating is maintained in a routing matrix data structure. A routing matrix is a two-dimensional construct that contains one column for each of the routing node's children (along with a column for it) and one row for each routing entry in the node's local routing table. FIG. 9 sets forth a routing matrix for didactic purposes. If a parent routing node has an entry in its routing table for a Publisher X and children A and B, this will account for three entries in the routing matrix—a row for Publisher X that intersects with a column for the parent nodes routing table and one column for each of the two children.

Each cell in the routing matrix contains an update stamp that represents the last time a routing entry was updated. Continuing with the example of FIG. 9, if the routing matrix entry in row "Publisher X" and column "Child Node B" is "1/4/03; 16:15" then the last time child node B's routing entry for Publisher X was updated was Jan. 4, 2003 at 4:15 p.m. Note that because child nodes possess only a subset of the entries in their parent's local routing table, some entries in the matrix will be empty. The "local routing table" column contains the update stamps that refer to the routing table entries in the parent node's local routing table. By comparing local routing table stamps to those in the child columns, the background process determines what routing table update requests it should compose and when. Each time the process encounters an update stamp in a child column that is earlier than the dirty update stamp in the same row, that process will spawn a thread that generates an update request and submits that request to the appropriate child.

In the example matrix provided by FIG. 9, update stamp values are denoted as date; time, with seconds omitted. Out of date entries are marked with shaded columns. On its next pass through the table, the background process executed by network services engine 52 or 54 responsible for keeping child nodes up to date will address the two out of date entries shown. Specifically, it will generate a request to Child B containing updated information on Subscriber X and a request to Child A with updated information on Action X.

In one embodiment, certain protocols and rules are implemented to adequately maintain the routing matrices and routing table data across the network. In one embodiment, when the child node updating process initializes, the process creates a routing matrix including "local routing table" update stamps from the local routing table of the network services engine and sets update stamp values in the cells of the child columns to "0/0/00" (zero date). Consequently, these zero dates generate the transmission of a large number of update requests to corresponding child nodes. Each time an update request is sent to a child node, the parent node enters the appropriate update stamp the current time in its routing matrix. So, if child B is sent an update request providing it with the latest information on Publisher X, the matrix entry in child B's column and Publisher X's row should then equal the time at which the update occurred.

In addition, when a new entry is made in the local routing table of the parent node, a corresponding row must be added to its routing matrix. The update stamp for the "local routing table" column is set to the current time and the matrix cell entries in the child columns are set to null. Similarly, when a child node is initialized it sends a message to its parent node indicating that it has come online. The parent node responds to this message by adding a column to its routing matrix (if one does not already exist for that child node) and setting all of the entries in that column to "empty."

When a parent node receives a Routing Entity Query request, indicating one of its children has experienced a routing fault, the parent node, as discussed above, attempts to serve that request and then, if the request was served successfully (indicated by an acknowledgement message), update the appropriate entry in its routing matrix to the then-current time. When a Routing Table Updater request is received by a parent node, indicating that its parent is passing along updated routing table information, the node should service the request by updating the appropriate routing table entries and then setting the "local routing table" update stamps for those entries to the then-current time.

C. Event Logging

In some embodiments, in the course of processing a service action request, information is extracted from that request and logged in a persistent store. For an instance of the network services engine 54, logging information, in one embodiment, is collected and stored in its associated database 62. To reduce the resources required to execute network services switch 56, logging functionality is offloaded to an instance of network services engine 54. Specifically, instead of interacting with a database, network services switch 56 encapsulates log data in a logging service action request or reporting token that is sent to a network services engine 54. Specifically, and in one embodiment, when a routing node processes a service request it (1) performs security checks, (2) passes a reporting token to a logging node, and (3) routes the request. Accordingly, the routing node does not actual log any information; rather, it delegates that duty to a separate node, preventing network services switch 56 and potentially other routing nodes from being impacted by the demands associated with persisting log data. The recipient network services engine 54 services the request or token by inserting the required data into the database. The logging of routing node errors, such as a routing fault, can be logged in the same manner. Furthermore, as FIG. 3 shows, some embodiments of web services network 40 include reporting node 58 dedicated to receiving and processing reporting tokens from network services switches 56 and network services engines 54. In one embodiment, all routing nodes (e.g., network services engines 54 and/or switches 56) transmit logging service action requests to reporting node 58.

D. Merging Networks

The generation of globally unique routing entity identifications and the network architecture disclosed herein allow for two different web services networks of the present invention to be merged in a relatively straightforward manner. As a first step, the root node of the first network must be assigned as a parent the root node of the second network.

Once a root routing node has been assigned a parent (thereby ceasing to be a root node), it is necessary for that node to provide its new parent with the contents of all of its routing table entries. In one embodiment, the routing entity creator service is employed to accomplish this task (see above). Specifically, once the former root node has been made aware of the identity of its new parent node, it invokes the routing entity creator service on each entry in its local routing table, providing the contents of those entries to its new parent node. Accordingly, the new root node will recognize existing entity names in its routing table thereby preserving the ability of the system to uniquely identify each entity. This will ensure that the root node of the combined network possesses a local routing table that reflects the contents of the global routing table as it exists after the merger takes place.

In addition, when two networks are merged, the nodes within those networks must have their network identifications updated to reflect the fact they are part of the same network. This will not happen automatically, as a consequence of making a node in one network the parent of the root node in another network, but as part of a greater configuration effort. Web service network administrators must decide upon a network identification that will serve to identify the entire network, and then assign it to each engine node in that network. The identification selected may be the same as that assigned to either of the networks being merged, but may also be entirely different.

What is claimed is:

1. A system enabling a web services network, comprising:
   a parent node operably connected to a computer network, the parent node comprising a first routing table stored in a persistent data store, the first routing table including routing entity data allowing for the routing of service action requests across the computer network; and
   at least one child routing node of the parent routing node, the at least one child routing node comprising a local routing table including routing entity data allowing for the routing of service action requests across the computer network,
   the routing entity data comprising one or more action names and corresponding network resource locators;
   the parent node and the child routing node each operably connected to the computer network to
   recieve service action requests including action names from subscribing nodes; and
   route the service action requests to respective service providing endpoints associated with the network resource locators corresponding to the action names,
   wherein the parent node is operative to add a routing entity to the local routing table of the child routing node in response to a routing entity request;
   wherein the child routing node, in response to a service action request requiring a routing entity not contained in the local routing table, transmits a routing entity request to the parent node.

2. The system of claim 1 wherein the parent node is operative to maintain the local routing table(s) on the child routing node(s) associated therewith.

3. The system of claim 1 wherein the parent node is operative to receive and process updates to routing entities in the first routing table; and wherein, in response to the updates, the parent node is operative to update the local routing table(s) on the child routing node(s) associated therewith.

4. The system of claim 1 wherein the parent node is a root node, and the first routing table is a global routing table.

5. The system of claim 1 wherein the parent node and the child routing node are each operative to establish respective connections to the service providing endpoints for transmission of the service action requests and receipt of responses to the service action requests.

6. The system of claim 2 wherein the parent node maintains a routing matrix in the persistent data store, wherein the routing matrix facilitates maintenance of the local routing table(s) of the child routing node(s) associated with the parent node.

7. The system of claim 6 wherein the routing matrix facilitates identification of out-of-date routing entities in the local routing table(s) of the child routing node(s) associated with the parent node.

8. The system of claim 7 wherein the routing matrix contains parent node update stamps for corresponding routing entities in the first routing table; and wherein, for each child routing node associated with the parent node, the routing matrix contains a routing node update stamp for each routing entity in the local routing table.

9. The system of claim 7 wherein the parent node is operative to update a routing entity in the local routing table of a child routing node based on a comparison of the corresponding parent node update stamp and routing node update stamp.

10. The system of claim 1 wherein the local routing table is a subset of the first routing table.

11. The system of claim 1 wherein the child routing node resides on a network routing device.

12. The system of claim 1 further comprising a console application providing a user interface facilitating configuration of the parent node and the child routing node.

13. The system of claim 12 wherein the console application transmits service action request operative to change the configuration of the parent node and/or the child routing node.

14. The system of claim 1 wherein the parent node includes platform services functionality allowing for configuration of the parent node and the child routing node; and wherein the platform services functionality is presented as a web service accessible via a service action request.

15. A system enabling a web services network, comprising:
   a root network services engine operably connected to a computer network,
      the root network services engine maintaining a persistent data store storing a global routing table including routing entity data allowing for the routing of service action requests over the computer network;
   a network services engine operably connected to the computer network, wherein the network services engine is a child of the root network services engine,
      the network services engine comprising a persistent data store storing a first local routing table including routing entity data allowing for the routing of service actions requests over the computer network;
   at least one network services switch operably connected to the computer network, wherein the at least one network services switch is a child of the network services engine,
      the network services switch comprising a second local routing table including routing entity data allowing for the routing of services actions requests over the computer network;
   the routing entity data comprising one or more action names and corresponding network resource locators;
   wherein the network services switch and the network services engine are each operative to
      receive service action requests, including action names, from subscribing nodes;
      route the service action requests to service providing endpoints associated with the network resource locators corresponding to the action names,
   wherein the root network services engine is operative to add a routing entity to the first and/or second local routing table in response to a routing entity request;
   wherein the network services engine is operative to add a routing entity to the second local routing table in response to a routing entity request;
   wherein the network services engine passes routing entity request associated with a routing entity not contained in the first local routing table to the root network services engine; and,
   wherein the network services switch is operative to transmit a routing entity request to the network services engine in response to a service action request requiring a routing entity not contained in the second local routing table.

16. The system of claim 15 wherein the root network services engine is operative to maintain the local routing tables on the child network services engines and switches operably directly associated therewith.

17. The system of claim 15 wherein the network services engine is operative to maintain the local routing tables of the child network services engines and switches operably directly associated therewith.

18. The system of claim 15 wherein the network services engine and the network services switch are each operative establish respective connections to the service providing endpoints for transmission of the service action requests and receipt of responses to the service action requests.

19. The system of claim 15 wherein the network services engine is operative to receive and process updates to routing entities in the first local routing table; and wherein, in response to the updates, the network services engine is operative to update the global routing table on the root network services engine and the second local routing table(s) on the routing node(s) associated therewith.

20. The system of claim 16 wherein the root network services maintains a routing matrix in the persistent data store, wherein the routing matrix facilitates maintenance of the local routing table of child network services engine(s) and the network services switches directly associated therewith.

21. The system of claim 20 wherein the routing matrix facilitates identification of out-of-date routing entities in the local routing table(s) of the child network services engine.

22. The system of claim 21 wherein the routing matrix contains parent node update stamps for corresponding routing entities in the global routing table; and wherein, for each child routing node directly associated with the root network services engine, the routing matrix contains a routing node update stamp for each routing entities in the local routing table.

23. The system of claim 21 wherein the network services engine is operative to update a routing entities in the local routing table of a child routing node based on a comparison of the corresponding parent node update stamp and routing node update stamp.

24. A method for providing a web services network on a computer network environment, the computer network environment including a plurality of routing nodes operative to route data between nodes connected to the computer network, the method comprising the steps of installing a network services engine on the computer network environment, wherein the network services engine comprises a first local routing table including routing entity data allowing for the routing of service actions requests over the computer network;

installing at least one network services switch on computer network environment, wherein the at least one network services switch is a child of the network services engine, and wherein the network services switch comprises a second local routing table including routing entity data allowing for the routing of service actions requests over the computer network; the routing entity data comprising one or more action names and corresponding network resource locators;

wherein the network services engine is operable to support and maintain the network services switch(es); and, wherein the network services switch and the network services engine are each operable to route service action requests including action names to service providing endpoints associated with the network resource locators corresponding to the action names;

wherein the network services switch is operative to transmit a routing entity request to the network services engine in response to a service action request requiring a routing entity not contained in the second local routing table;

wherein the network services engine is operative to add a routing entity to the second local routing table in response to a routing entity request.

25. The method of claim 24 wherein the network services switch(es) are installed on existing routing nodes in the computer network environment.

* * * * *